United States Patent [19]
Stein

[11] Patent Number: 5,899,808
[45] Date of Patent: May 4, 1999

[54] SELF-PROPELLING HARVESTER THRESHER WITH HURDLE SHAKER AND TRANSPORTING PRONGS ABOVE THE LATTER

[75] Inventor: Franz Stein, Harsewinkel, Germany

[73] Assignee: Claas KGaA, Harsewinkel, Germany

[21] Appl. No.: 08/907,437

[22] Filed: Aug. 8, 1997

[30] Foreign Application Priority Data

Aug. 13, 1996 [DE] Germany .......................... 196 32 567

[51] Int. Cl.⁶ .................................................. A01F 12/38
[52] U.S. Cl. .................................. 460/84; 460/85; 460/89
[58] Field of Search ................................ 460/84, 85, 86, 460/87, 88, 89, 90, 94, 96, 119, 145

[56] References Cited

U.S. PATENT DOCUMENTS

| | | | |
|---|---|---|---|
| 750,855 | 2/1904 | Hoisington | 460/89 |
| 784,971 | 3/1905 | Bailey | 460/89 |
| 3,620,223 | 11/1971 | Witzel et al. | |

FOREIGN PATENT DOCUMENTS

| | | | |
|---|---|---|---|
| 48045 | 11/1933 | Denmark | 460/87 |
| 24 26 731 | 12/1975 | Germany . | |

Primary Examiner—Terry Lee Melius
Attorney, Agent, or Firm—Michael J. Striker

[57] ABSTRACT

A self-propelling harvester thresher has a threshing unit, a hurdle shaking unit located after the threshing unit, a crankshaft, a plurality of transporting prongs which are drivingly controlled by the crankshaft and arranged above the hurdle shaking unit, a rake associated with the transporting prongs and including a plurality of individual passively turnable fingers arranged at a distance from one another so that the transporting prongs pass during an operation between the fingers, and a structure for drivingly positively controlling a turning movement of the fingers.

10 Claims, 2 Drawing Sheets

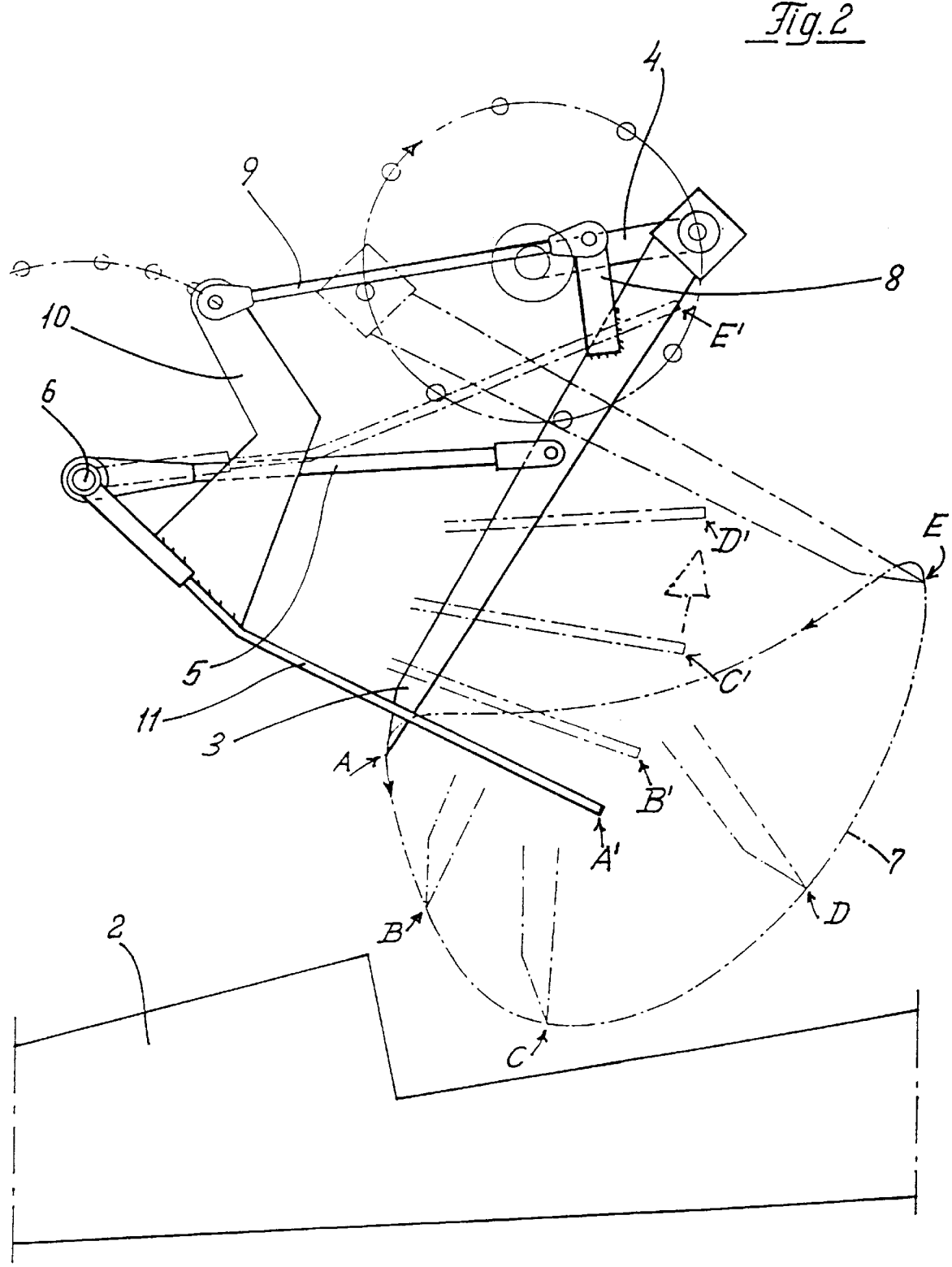

SELF-PROPELLING HARVESTER THRESHER WITH HURDLE SHAKER AND TRANSPORTING PRONGS ABOVE THE LATTER

BACKGROUND OF THE INVENTION

The present invention relates to a self-propelling harvester thresher with hurdle shakers located after a threshing device, and with transporting prongs which are drivingly controlled from a crankshaft and arranged above the hurdle shakers. A stationarily arranged turnable rake is associated with a transporting prongs and composed of a plurality of individual fingers which are spaced from one another and are individually passively turnable. The transporting prongs pass through intermediate spaces between the fingers during the operation.

Such harvester thresher is disclosed for example in the German patent document DE-OS 24 26 731. As shown in particular in FIG. 1 and disclosed in the associated specification text, a rake which is composed of a plurality of parallel fingers is supported by a spring around a stationary axle, which must guide the harvested product stream supplied from the threshing mechanism in direction of the hurdle shaker. The transporting prongs located above the hurdle shaker must loosen the product mat and support the transporting action of the hurdle shaker. The rake is relatively short to provide a sufficient high space for passage of the harvested product between the downstream end of the rake and the hurdle shaker. As a result, the transporting prongs pass through the rake in the first phase of their transporting stroke. Such an arrangement has the danger that the transporting prongs during their return stroke can displace the harvested product and press it behind the rake. Over a long time, an accumulation is formed and prevents a required turning movement of the rake. A stoppage of the harvester thresher and the expensive manual elimination of the accumulated product is a result of such an operation.

SUMMARY OF THE INVENTION

Accordingly, it is an object of present invention to provide a self-propelling harvester thresher of the above mentioned general type, which avoids the disadvantages of the prior art.

More particularly, it is an object of present invention to provide a self-propelling harvester thresher which on the one hand securely strips off from the rake the harvested product which is located during the return stroke of the transporting prongs before it, and on the other hand provides a sufficiently great throughgoing space between the rake and the hurdle shaker during the transporting stroke for the harvested product.

In keeping with these objects and with others which will become apparent hereinafter, one feature of present invention resides, briefly stated, in a self-propelling harvested thresher in which the turning movement of the individual rake fingers is driven in a positively controlled manner. At least one rake finger is associated with each transporting prong, and the turning movement of the individual rake finger is positively controlled in dependence on the position of the transporting prongs associated with the rake fingers.

In accordance with a further feature of present invention, each transporting prong is connected through a link with the associated rake finger. In order to optimally adjust the movement of the rake fingers, the link is longitudinally adjustable.

In accordance with another embodiment of the present invention, all links controlling the transporting prongs are supported on a common axle so that the rake fingers are also turnable.

It has been determined that it is advantageous when each rake finger in the region of its support has an upwardly extending holder through which each rake finger is articulately connected with the associated transporting prong through a link.

In accordance with another advantageous feature of present invention, each link is articulately connected with its transporting prong through a console which is fixedly connected with the associated transporting prong. In accordance with a further advantageous embodiment of the present invention, a vertical distance of each rake finger at its freely extending end from the hurdle shaker located next to it has a minimal value at the beginning of the working stroke (at front reverse point) of an associated transporting rake, and has a maximum value substantially at the end of the working stroke (at rear reverse point). In addition, the transporting prongs during the circular movement must constantly pass through the rake.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a view showing a movement path of a transporting prong as well as a movement path of an associated rake finger during a forward stroke.

DESCRIPTION OF PREFERRED EMBODIMENTS

Figure 1:
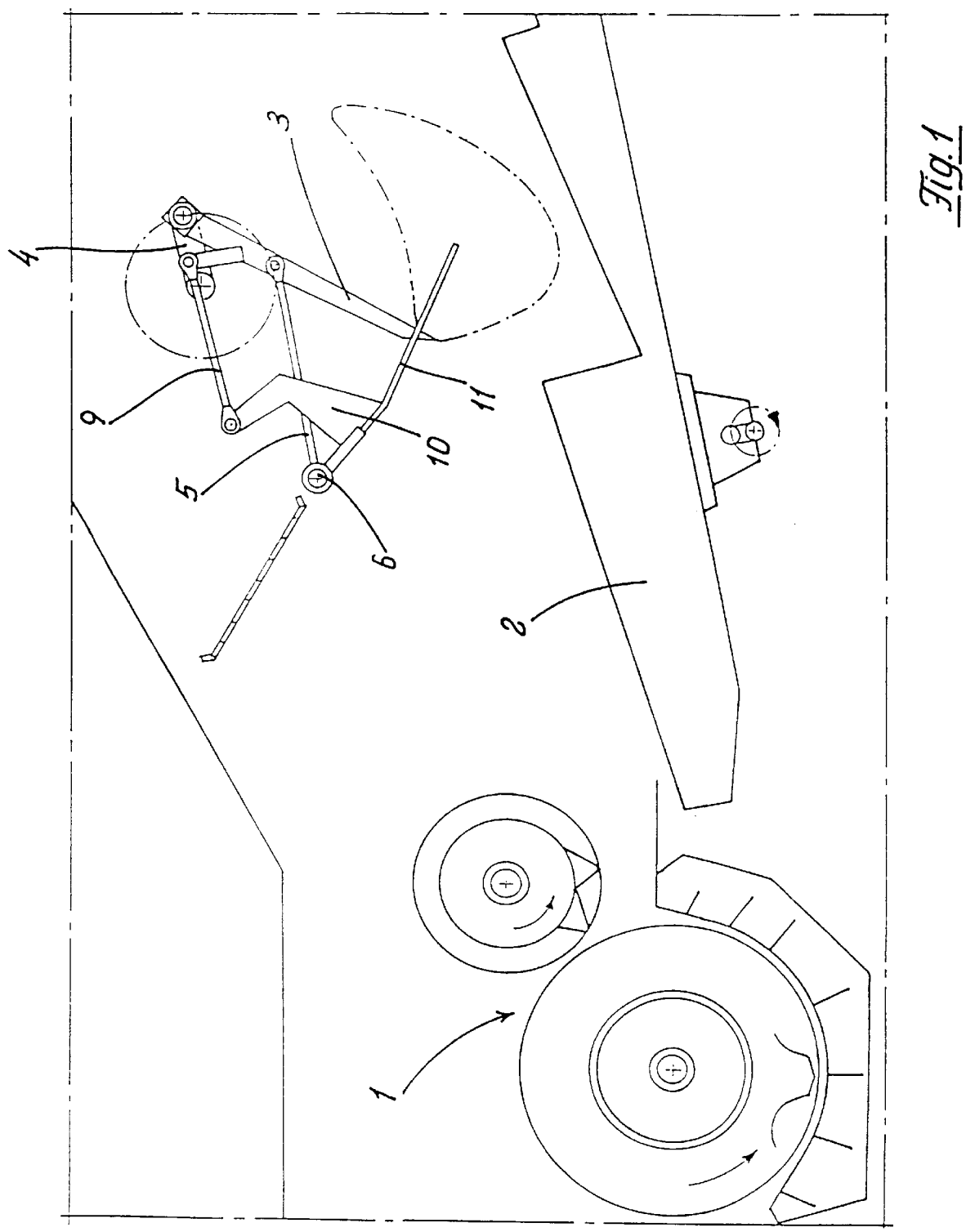
FIG. 1 is a side view of important parts of a self-propelling harvester thresher in accordance with the present invention.

A self-propelling harvester thresher in accordance with the present invention has a known threshing mechanism which is identified with reference numeral 1. A not shown product mat is supplied by the threshing mechanism to a hurdle shaker 2. A plurality of transporting prongs 3 are supported on a crankshaft 4 above the hurdle shaker. Each transporting prong 3 is supported under the crankshaft 4 by a link 5 on an axle 6 which is common for all links 5. This arrangement is selected so that the tips of the transporting prongs 3 during a rotation of the crankshaft 4 pass over a kidney-shaped curved path which is shown in dash-dot lines 7 in FIG. 2.

A console 8 is welded with each transporting prong 3 between an articulation point of one link 5 on one transporting prong 3 and the crankshaft. A link 9 engages with the console 8. The end of each link 9 which faces away from the console 8 is hingedly connected with a holder 10. Each holder is welded with a rake finger 11. All rake fingers 11 which are spaced from one another and form a rake are turnably connected, similarly to the links 5 on the common axle 6.

FIG. 2 shows the tip of a transporting prong 3 in five different positions A, B, C, D, E. Since each rake finger 11 is positively controlled by the associated transporting prong 3 the position of each associated rake finger 11 changes in correspondence with the position of the transporting prong 3. These interconnections are illustrated in the drawings. The position A of the transporting prong 3 corresponds to the position A' of the associated rake finger 11, etc.

It can be clearly seen that the transporting prong 3 during its working stroke and also during its return stroke is covered laterally always by a rake finger 11. This provides the guarantee that the transporting prongs at their return stroke are not in the position to transport the product behind a rake finger 11. Furthermore, by a transporting prong at the beginning of its return stroke, the displaced material is stripped from the associated rake finger 11 downwardly in direction of the hurdle shaker 2. Moreover, it can be seen that during the transporting stroke of a transporting prong 3, the associated rake finger 11 deviates upwardly. Thereby a great free space is released for passage in the harvested products between the rake finger 11 and the hurdle shaker 2.

It will be understood that each of the elements described above, or two or more together, may also find a useful application in other types of constructions differing from the types described above.

While the invention has been illustrated and described as embodied in self-propelling harvester thresher with hurdle shaker and transporting prongs above the ladder, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A self-propelling harvester thresher, comprising threshing means; hurdle shaking means located after said threshing means; a crankshaft; a plurality of turnable transporting prongs which are connected with and turned by said crankshaft and arranged above said hurdle shaking means; a rake associated with said transporting prongs and including a plurality of individual turnable fingers arranged at a distance from one another so that said transporting prongs pass during an operation between said fingers; and means spaced from said crankshaft and connecting said fingers with said transporting prongs for drivingly positively controlling a turning movement of said fingers by a turning movement of said transporting prongs so that said transporting prongs move along said fingers.

2. A self-propelling harvester thresher as defined in claim 1, wherein at least one of said fingers is associated with a respective one of said transporting prongs, said means for drivingly positively controlling the turning movement of said fingers being formed so that said turning movement of said fingers is positively controlled in dependence on a position of said transporting prongs associated with said fingers.

3. A self-propelling harvester thresher as defined in claim 1, wherein said means for drivingly positively controlling the turning movement of said fingers include a link which connects each of said transporting prongs with an associated one of said fingers.

4. A self-propelling harvester thresher as defined in claim 3, wherein each of said links is longitudinally adjustable.

5. A self-propelling harvester thresher as defined in claim 3, wherein all said links which control said transporting prongs are supported on a common axle, said fingers being turnable around said axle.

6. A self-propelling harvester thresher as defined in claim 1, wherein said means for drivingly positively controlling the turning movement of said fingers include an upwardly extending holder provided on each finger in the region of a support of said finger and connecting each of said fingers with an associated one of said transporting prongs through an additional link.

7. A self-propelling harvester thresher as defined in claim 6; and further comprising a console which is fixedly connected with a respective one of said transporting prongs so that each of said additional links is articulately connected with a respective one of said transporting prongs through said console.

8. A self-propelling harvester thresher as defined in claim 1, wherein said fingers are arranged so that a vertical distance from a freely moving end of each of said fingers to an adjacent one of said hurdle shaking means at a beginning of a working stroke of an associated one of said transporting prongs has a minimum value and at an end of the working stroke has a maximum value.

9. A self-propelling harvester thresher, comprising threshing means; hurdle shaking means located after said threshing means; a crankshaft; a plurality of turnable transporting prongs which are connected with and turned by said crankshaft and arranged above said hurdle shaking means; a rake associated with said transporting prongs and including a plurality of individual turnable fingers arranged at a distance from one another so that said transporting prongs pass during an operation between said fingers; and means connecting said fingers with said transporting prongs for drivingly positively controlling a turning movement of said fingers a turning movement of said transporting prongs so that said transporting prongs move along said fingers, said transporting prongs being arranged so that during the turning movement of said transporting prongs when said transporting prongs perform a working stroke and also during the turning movement of said transporting prongs when said transporting prongs perform a return stroke, said transporting prongs constantly pass through said rake.

10. A self-propelling harvester thresher, comprising threshing means; hurdle shaking means located after said threshing means; a crankshaft; a plurality of turnable transporting prongs which are connected with and turned by said crankshaft and arranged above said hurdle shaking means; a rake associated with said transporting prongs and including a plurality of individual turnable fingers arranged at a distance from one another so that said transporting prongs pass during an operation between said fingers; and means connecting said fingers with said transporting prongs for drivingly positively controlling a turning movement of said fingers by a turning movement of said transporting prongs so that said transporting prongs move along said fingers; and additional connecting means which connect said transporting prongs with said fingers, said additional connecting means include a plurality of additional links having two opposite ends, an upwardly extending holder provided on each of said fingers and hingedly connecting each of said fingers with one end of each of said additional links, and a console fixedly connected with a respective one of said transporting prongs and hingedly connected with the other end of each of said additional links.

* * * * *